United States Patent [19]

Onishi et al.

[11] Patent Number: 5,335,116

[45] Date of Patent: Aug. 2, 1994

[54] METHOD AND APPARATUS FOR RECORDING ANALOG VIDEO SIGNAL IN COMPRESSED DIGITAL FORMAT

[75] Inventors: Ken Onishi; Hidenori Banjyo; Yukari Arano, all of Nagaokakyo, Japan

[73] Assignee: Mitsubishi Denki Kabushiki Kaisha, Tokyo, Japan

[21] Appl. No.: 147,035

[22] Filed: Nov. 4, 1993

Related U.S. Application Data

[63] Continuation of Ser. No. 979,554, Nov. 20, 1992, abandoned, which is a continuation of Ser. No. 518,112, May 3, 1990, abandoned.

[30] Foreign Application Priority Data

May 9, 1989 [JP] Japan ................................ 1-115738
May 9, 1989 [JP] Japan ................................ 1-115739

[51] Int. Cl.⁵ ............................................. H04N 5/782
[52] U.S. Cl. ..................................... 360/9.1; 360/32; 360/40; 360/64; 360/73.13
[58] Field of Search ............... 360/27, 9.1, 10.3, 8, 360/13, 73.07, 73.09, 73.13, 32, 40, 47, 53, 64

[56] References Cited

U.S. PATENT DOCUMENTS

| | | | |
|---|---|---|---|
| 4,490,755 | 12/1984 | Tokuyama | 360/73.09 |
| 4,761,693 | 8/1988 | Higashi et al. | 360/13 |
| 4,769,722 | 9/1988 | Itoh et al. | 360/27 |
| 4,772,961 | 9/1988 | Ichinoi | 360/9.1 |
| 4,862,292 | 8/1989 | Enari et al. | 360/8 |
| 4,887,169 | 12/1989 | Bannai et al. | 360/64 |
| 4,905,104 | 2/1990 | Okamoto et al. | 360/70 |
| 4,920,242 | 4/1990 | Hosaka et al. | 360/9.1 |
| 5,045,955 | 9/1991 | Ikeda | 360/9.1 |
| 5,063,453 | 11/1991 | Yoshimura et al. | 360/32 |

FOREIGN PATENT DOCUMENTS

| | | |
|---|---|---|
| 0112534 | 7/1984 | European Pat. Off. . |
| 3722577 | 1/1988 | Fed. Rep. of Germany . |
| 3819393 | 12/1988 | Fed. Rep. of Germany . |
| 62-26606 | 2/1987 | Japan . |
| 62-137771 | 6/1987 | Japan . |

OTHER PUBLICATIONS

"An experimental digital video tape recorder" by Yokoyama SMPTE Journal V. 89 Mar. 1980 pp. 173–180.

Primary Examiner—W. R. Young

[57] ABSTRACT

A digital video recording system for digitizing analog video signals and recording the digital signals on video tape and for reading digital video signals from video tape and producing an analog video signal. The recording system comprises an A/D converter, a data compressor for compressing digital video signals at a data rate of 1/N (N: an integer greater than 1), a selector mechanism for selecting between the compressed digital video signal and a non-compressed digital video signal, and a control mechanism for controlling the system such that recording data for one field, which is normally recorded in M tracks (M: an integer greater than N) in ordinary recording mode, is recorded in about M/N tracks in a long recording mode.

30 Claims, 8 Drawing Sheets

METHOD AND APPARATUS FOR RECORDING ANALOG VIDEO SIGNAL IN COMPRESSED DIGITAL FORMAT

This application is a continuation of application Ser. No. 07/979,554, filed Nov. 20, 1992, now abandoned, which application is a continuation of application Ser. No. 07/518,112, filed May 3, 1990, now abandoned.

BACKGROUND OF THE INVENTION

1. Field of the Invention

The present invention relates to digital video signal recording system and apparatus for recording digital video signals on a magnetic tape. More particularly, the present invention relates to a digital video signal recording system and apparatus operated both in an ordinary recording mode and in a long recording mode which enables recording for N (N: an integer) times as long hours as those in an ordinary recording mode.

2. Description of the Related Art

As an apparatus for recording picture information and sound information on a magnetic tape, an analog video tape recorder (VTR) such as a VHS VTR is conventionally known.

FIG. 10 schematically shows a general magnetic recording/reproducing means in a VTR.

In FIG. 10, a magnetic tape 1, a rotary drum 2 and rotary heads 3 and 4 are shown.

The magnetic tape 1 travels in parallel with the plane the drawing, while the rotary drum 2 rotates in the state being inclined at a predetermined angle with respect to the direction vertical to the plane of the drawing.

The rotary heads 3 and 4 are provided on the periphery of the rotary drum 2 in such a manner as to come into contact with the magnetic tape 1. Since the magnetic tape 1 is wound half around the periphery of the rotary drum 2, the magnetic tape 1 is scanned with the rotary heads 3 and 4 in an oblique direction. Consequently, the area of the magnet-tape 1 scanned in one cycle, which is called a track, is situated obliquely relative to the longitudinal direction of the magnetic tape 1.

the rotary drum 2 is rotated at a rate of about 1,800 rpm so as to record analog video signals for 1 field per track recording is carried out at a speed of 1 field/about 60 sec.

A VTR operated both in an ordinary recording mode and in a long recording mode is known. FIGS. 11 and 12 show the patterns of the tracks T1 and T2 in such a VTR in an ordinary recording mode and a long recording mode, respectively. In the case of a VHS system, the widths of the tracks T1, T2, namely the track pitches are about 58 $\mu$m and 19 $\mu$m in an ordinary recording mode and a long recording mode, respectively.

FIGS. 11 and 12, a belt-like control track (hereinunder referred to as "CT") 1a is provided in the longitudinal direction of the magnetic tape 1.

If the video signal recorded on the magnetic tape 1 is an NTSC video signal, a signal having a frequency of 30 Hz is recorded as a CT signal. The CT signal is a signal for controlling the travelling speed of the magnetic tape 1 by a servomechanism.

In order to realize the track patterns in both ordinary recording mode and long recording mode by one apparatus, each of the rotary heads 3 and 4 is composed of heads 3a, 3b and 4a, 4b, respectively, which have different scanning track widths from each other, (each of the rotary heads 3 and 4 is composed of what is called a combination head), as shown in FIG. 10 and the travelling speed of the magnetic tape 1 is changed in accordance with the mode.

For example, in a long playing mode for recording for N times as long hours as those in an ordinary recording mode, the travelling speed of the magnetic tape 1 is reduced to 1/N. In this case, as shown in FIG. 13, the period in which the CT signal is situated on the magnetic tape 1 in a long recording mode is reduced to 1/N of the period in an ordinary recording mode.

In reproducing the video signals recorded on the tracks T1 and T2, the CT signals are simultaneously reproduced from the CT 1a. If the travelling speed of the magnetic tape 1 is controlled by a servomechanism so that the reproduced CT signal has a frequency of 30 Hz (the frequency of a CT signal recorded in an ordinary recording mode) both in an ordinary recording mode and in a long recording mode, it is possible to reproduce the video signals.

In this way, recording/reproducing is conventionally possible both in an ordinary recording mode and in a long recording mode. However, the quality of the video signal reproduced in a long recording mode is inferior to that ordinary recording mode, because the track pitch is smaller. For this reason, a long recording mode is conventionally adopted when the reproduced video signals are not specially required to have a high quality or when long recording is necessary.

The above explanation is as to a system for recording analog signals on a magnetic tape. When the principle of this system is applied to recording of digital video signals on a magnetic tape, the following problems are produced.

a) In recording a digital video signal, it is necessary to keep the areal recording density and the linear recording density at the optimum values in order to secure a reproducing output. However, the areal recording density becomes small when the track pitch is small. Therefore, if the track pitch is reduced in a long recording mode, it is impossible to obtain an adequate reproducing output as in recording analog video signals.

b) On the other hand, if the number of revolutions of the rotary drum is reduced instead of reducing the track pitch, the relative speed between the rotary head and the magnetic tape greatly changes, thereby changing the electromagnetic transducing characteristics of the rotary head. In this case, it is also difficult to keep the good quality of the reproduced video signals.

SUMMARY OF THE INVENTION

Accordingly, it is an object of the present invention eliminate the above-described problems in the related art and to provide a digital video recording system and apparatus which is capable of recording digital video signals without changing the track pitch and the electromagnetic transducing characteristics of the rotary head.

To achieve this aim, in a digital video signal recording system of the present invention, recording in a long recording mode is carried out in the following manner.

a) Recording data in the form of digital video signals are compressed at a data rate of 1/N (N: an integer) of the data rate adopted in recording in an ordinary recording mode, thereby producing compressed data.

b) The magnetic tape is fed at a speed of 1/N of the speed adopted in recording in an ordinary recording mode.

c) The compressed data for 1 field are recorded in a recording time of 1/N as long as the time for recording uncompressed data in an ordinary recording mode.

As a result, the recording data for 1 field which are recorded in M (M; an integer) tracks in an ordinary recording mode are recorded in about M/N intermittent tracks in a long recording mode.

According to this system, a long recording mode for recording for N times as long hours as those in an ordinary recording mode is realized without changing the track pitch and the number of revolutions of the rotary drum from those in an ordinary recording mode. It is therefore possible to record digital video signals on a magnetic recording while keeping the quality of the reproduced video signals without involving the lowering of the reproducing output a change in electromagnetic transducing characteristics, etc.

It is also possible to record in a long recording mode by collectively recording digital video signals in L tracks (L: an integer) as a unit by using an L-channel rotary head. In this case, the tracks for one cycle of recording are linear.

A digital video signal recording apparatus according to the present invention includes the following components:

a) magnetic tape feeding means for feeding a magnetic tape at a constant speed;

b) a rotary head for recording digital recording data in tracks on the magnetic tape;

c) a recording means for (1) producing recording data from digital video signals;

(2) supplying the recording data on the rotary head and recording the data in a track of the magnetic tape in an ordinary recording mode; and (3) compressing the recording data at a data rate of 1/N (N: an integer) of the data rate adopted in recording in an ordinary recording mode, thereby producing compressed data, supplying the compressed data to the rotary head as recording data and recording the data in a track of the magnetic tape in a long recording mode; and d) control means for (1) controlling the magnetic tape feeding means in a long recording mode so that the feeding rate of the magnetic tape is 1/N of the rate in an ordinary recording mode; and (2) controlling the recording means in a long recording node so that the recording data for 1 field are recorded the recording time of 1/N as long as the recording time in an ordinary recording mode.

As a result, the recording data for 1 field are recorded on M (M: an integer) tracks in an ordinary recording mode, and about M/N intermittent tracks in a long recording mode.

According to this apparatus, recording in a long recording mode is enabled while keeping the quality of the reproduced video signals without involving the lowering of the reproducing output, a change in electromagnetic transducing characteristics, etc. It is also possible to collectively record in L tracks as a unit by using an L-channel head in the same way as in the above-described system.

The rotary head is, for example, an L (L: an integer)-channel head provided on the periphery of a rotary drum which rotates at a predetermined angular velocity.

The magnetic tape feeding means includes, for example, a capstan motor, a fixed head and a capstan servo controller. In this structure, the magnetic tape is fed by the capstan motor and a magnetic tape feeding speed control signal is recorded/reproduced by the fixed head into/from the control track which is provided in the longitudinal direction of the magnetic tape. The frequency of the magnetic tape feeding speed control signal reproduced by the fixed head is detected by the capstan servo controller. The capstan servo controller further controls the capstan motor by a servomechanism. It is therefore possible to feed the magnetic tape at a constant speed.

A digital video signal dealt with by the apparatus of the present invention is composed of, for example, segments each of which contains an identification code representing whether it is operated in an ordinary recording mode or in a long recording mode. In this case, the recording means records the recording data for N segments as 1 field on the magnetic tape.

The apparatus of the present invention may be further provided with a reproducing means which operates in the following manner. When the recording data recorded on the magnetic tape are reproduced by the rotary head, the reproduced recording data, namely, the reproducing data are reproduced into digital video signals by the reproducing means. At this time, the reproducing means reproduces the data for M tracks in an ordinary recording mode, and the data for intermittent M/N tracks in a long recording mode as 1 field into digital video signals.

The recording means in the apparatus of the present invention includes, for example, the following components:

a) an A/D converter for converting an analog video signal input into a digital video signal;

b) a data compressor for a long recording mode which compresses digital video signals so as to produce compressed data for long recording;

c) a data compressor for an ordinary recording mode which compresses digital video signals at a data rate of 1N of the data rate adopted for compressed data for long recording, thereby producing compressed data for ordinary recording;

d) selector on the recording side for reading digital video signals or the compressed data for ordinary recording and the compressed data for long recording, selecting, the digital video signals or the compressed data for ordinary recording at the time of ordinary recording and the compressed data for long recording at the time of long recording, respectively, and outputting the selected data as recording data;

e) an encoder for shuffling the recording data and adding an error-correcting code thereto; and f) a modulator for modulating the recording data in a predetermined modulating system.

The reproducing means may be composed of the following components in correspondence with the respective components of the recording means:

g) a demodulator for demodulating the reproduced data in a demodulating system corresponding to the modulating system of the modulator;

h) a decoder for correcting the error of the reproducing data and rearranging the reproduced data according to the rule corresponding to the rule for shuffling and encoding of the encoder;

i) data expander for an ordinary recording mode which expands the reproduced data and outputs the reproduced data as expanded data for ordinary recording;

j) a data expander for a long recording mode which expands the reproduced data to N times of the data rate of the expanded data for ordinary recording so as to produce expanded data for long recording;

k) selector on the reproducing side for reading the expanded data for ordinary recording or the reproduced data and the expanded data for long recording, selecting the expanded data for ordinary recording or the reproduced data at the time of ordinary recording and the expanded data for long recording at the time of long recording, respectively, and outputting the data as digital video signals; and l) a D/A converter for converting the digital video signal into an analog video signal, The above and other objects, features and advantages of the present invention will become clear from the following description of the preferred embodiments thereof, taken in conjunction with the accompanying drawings.

DESCRIPTION OF THE PREFERRED EMBODIMENTS

Preferred Embodiments of the present invention will be explained hereinunder with reference to the accompanying drawings.

Figure 1:
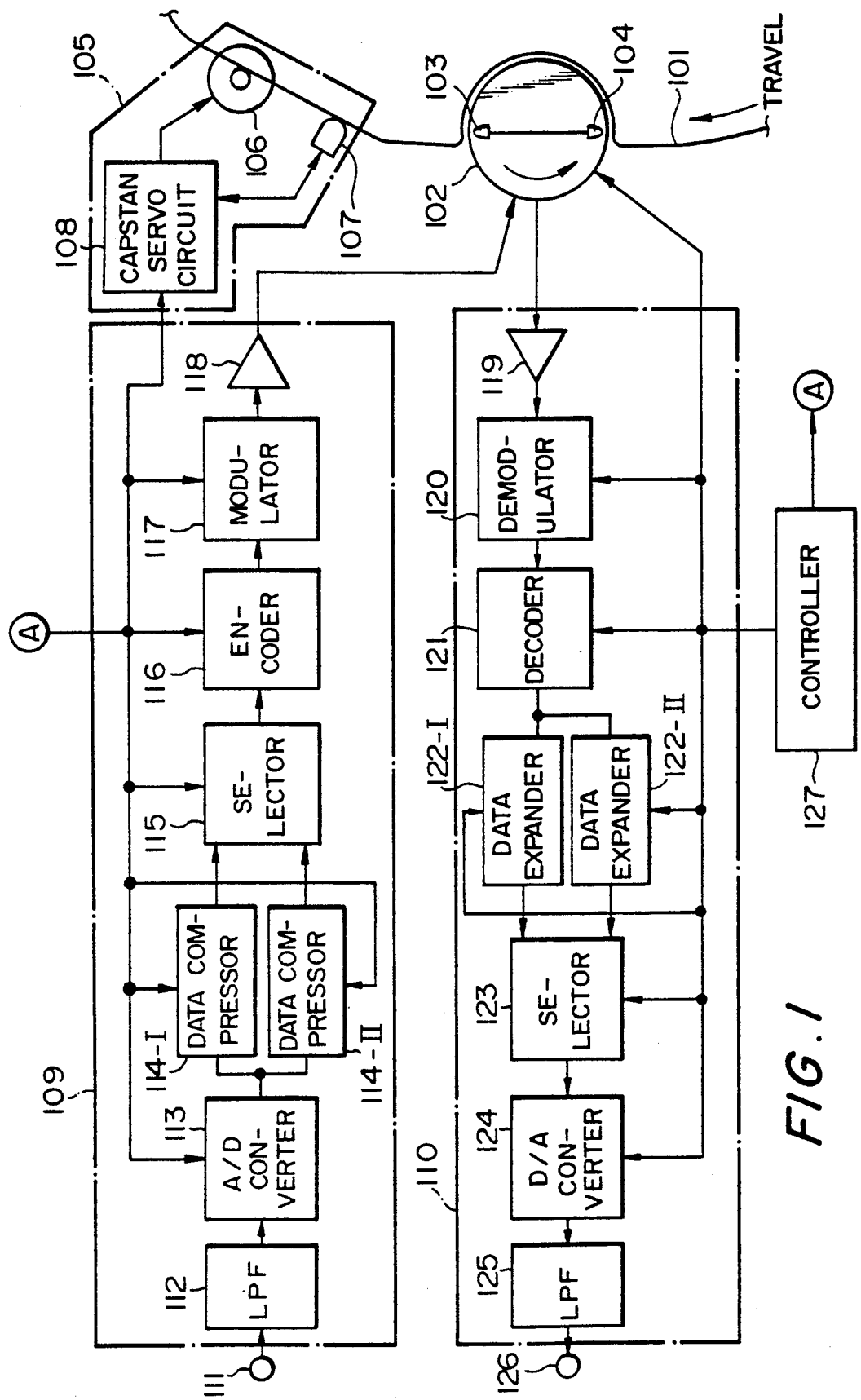
FIG. 1 is a block diagram of the structure of a first embodiment of a digital video signal apparatus according to the present invention.

FIG. 1 shows the structure of a first embodiment of a digital video signal recording apparatus according to the present invention.

The apparatus shown in FIG. 1 includes a rotary drum 102 with a magnetic tape 101 wound half around the periphery thereof and rotary heads 103 and 104 provided on the periphery of the rotary drum 102 at the diametrically symmetrical positions.

When a signal is supplied to the rotary head 103 or 104 through a rotary transformer (not shown) provided within the rotary drum 102, the signal is recorded on the magnetic tape 101. Reversely, the signal reproduced from the magnetic tape 101 by the rotary head 103 or 104 is externally output through the rotary transformer.

The apparatus of this embodiment also includes a servomechanism 105 for controlling the feeding rate of the magnetic tape 101. The servo mechanism includes a capstan, motor 106, a fixed head 107 and a capstan servo circuit 108.

A signal having a frequency of, for example, 30 Hz is written by the fixed head 107 into a CT 101a (see FIGS. 4 and 6) of the magnetic tape 101. The signal written into the CT 101a is reproduced by the fixed head 107. By controlling the rotation of the capstan motor 106 by the capstan servo circuit 108 so that the reproduced CT signal has a constant frequency, the magnetic tape 101 travels at a constant speed.

The apparatus of this embodiment is also provided with a recording portion 109 and a reproducing portion 110.

The signal to be recorded on the magnetic tape 101 by the rotary head 103 or 104 is the signal output from the recording portion 109, and the signals output from the rotary heads 103 and 104 are supplied to the reproducing portion 110.

The recording portion 109 includes an LPF 112, an A/D converter 113, data compressors 114-I and 114-II, a selector 115, an encoder 116, a modulator 117 and a recording amplifier 118.

The analog video signal input into an input terminal 111 is first subjected to band limitation by the LPF 112. For example, when an NTSC composite video signal is input into the input terminal 111, the LPF 112 limits the frequency thereof to the band of 4.2 MHz.

The LPF 112 is connected to the A/D converter 113 for converting an analog video signal to a digital video signal. For example, the video signal with the frequency limited to the band of 4.2 MHz by the LPF 112 is sampled by 4 times as high a frequency as the color subcarrier frequency Fsc (=about 3.58 MHz) by the A/D converter 113, thereby producing quantized 8-bit data.

The rate of the data is about $4 \times Fsc \times 8 = 115$ MBPS, and the rate of the data with vertical and horizontal blanking data removed therefrom, namely, the effective data rate is about 90 MBPS. The data compressor 114-I further compresses the effective data rate to $\frac{1}{3}$, namely, 30 MBPS and the data compressor 114-II compresses the effective data rate to about 1/9, namely, 10 MBPS.

The data compressors 114-I and 114-II are connected to the selector 115. The selector 115 selects either the data compressed by the data compressor 114-I or the data compressed by the data compressor 114-II and supplies the selected data to the encoder 116.

The encoder 116 shuffles the data supplied from the selector 115 and adds an error-correcting code thereto. As a result of these processings, the data rate is compressed to about 40 MBPS (when the selector 115 selects the output the data compressor 114-I) or about 13 MBPS (when the selector 115 selects the output of the data compressor 114-II).

The modulator 117 is connected to the encoder 116. The modulator 117 subjects the signal processed by the encoder 116 in the above-described way to digital modulation. The output of the modulator 117 is supplied to the rotary head 103 or 104 through the recording amplifier 118.

The reproducing portion 110 includes a reproduction amplifier 119, a demodulator 120, a decoder 121, data expanders 122-I, 122-II, a selector 123, a D/A converter 124 and an LPF 125.

The signal reproduced from the magnetic tape 101 by the rotary heads 103 and 104 is first input to the reproduction amplifier 119 and supplied to the demodulator 120. The demodulator 120 digitally demodulates the supplied signal in accordance with the demodulating system which corresponds to the modulating system of the modulator 117 after the equalization, the clock reproduction and signal detection.

The decoder 121 is connected to the demodulator 120 The decoder 121 subjects the data demodulated by the demodulator 120 to time axis correction, error correction and reverse shuffling, and outputs the thus-processed data.

The data output from the decoder 121 is supplied to the data expanders 122-1 and 122-II. The data expander 122-I expands the rate of the supplied data to 3 times, while the data expander 122-II expands the rate of the supplied data to 9 times. Therefore, if the data compressed by the data compressor 114-I and recorded on the magnetic tape 101 is expanded by the data expander 122-I, the data with the rate before compression is obtained. Similarly, if the data compressed by the data compressor 114-II and recorded on the magnetic tape 101 is expanded by the data expander 122-II, the data with the rate before compression is obtained.

Namely, original effective data of 90 MBPS rate obtained.

The selector 123 selects and outputs either the data expanded by the data expander 122-1 or the data expanded by the data expander 122-II.

The D/A converter 124 is connected to the selector 123. The D/A converter 124 converts the output of the selector 123 to an analog video signal. The analog video signal output from an output terminal 126 after the signal out of the band is removed by an LPF 125.

The apparatus shown in FIG. 1 is further provided with a controller 127.

The controller 127 controls the operation timings of the recording portion 109 and the reproducing portion 110, the operation mode of the capstan servomechanism 105 and the recording timings of the rotary heads 103 and 104.

Figure 2:
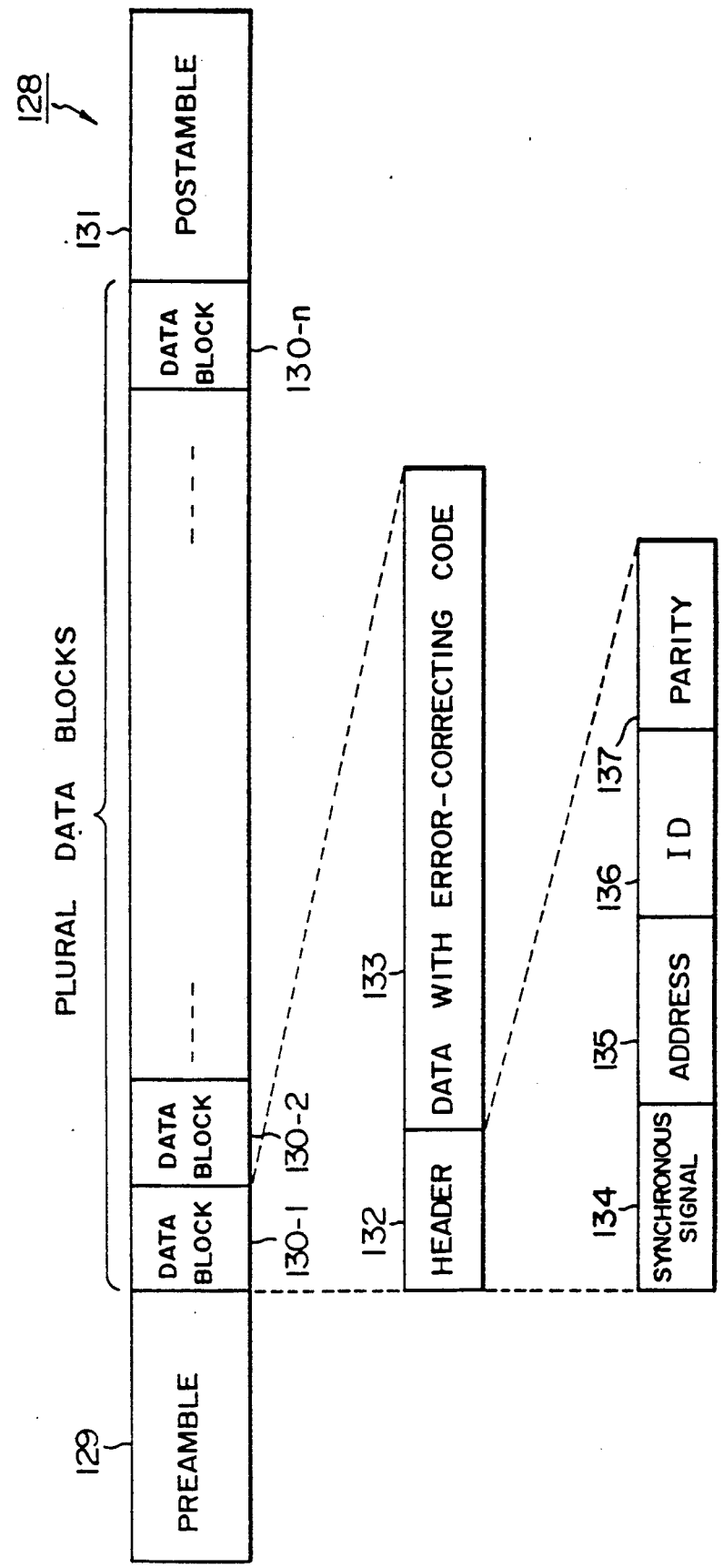
FIG. 2 shows the structure of the data dealt with by the first embodiment shown in FIG. 1, each of the data block including an ID which indicates whether the apparatus is in an ordinary recording mode or in a long recording mode.

The format of the data recorded by the apparatus of this embodiment will now be explained. FIG. 2 shows the format of the data adopted in this embodiment.

As shown in FIG. 2, one segment 128 is composed of a preamble 129, n data blocks 130-1, 130-2, ... 130-n and a postamble 131.

One data block (e.g., 130-1) is composed of a header 132 and one item of data 133 with an error-correcting code added thereto by the encoder 116.

The header 132 includes a synchronous signal 134, an address 135, an ID 136 and a parity 137.

The ID 136 represents an identification code which indicates whether the apparatus is operated in an ordinary recording mode or in a long recording mode. The recording operations of the apparatus of this embodiment in an ordinary recording mode and in a long recording mode will be explained hereinunder separately from each other.

Figure 3:
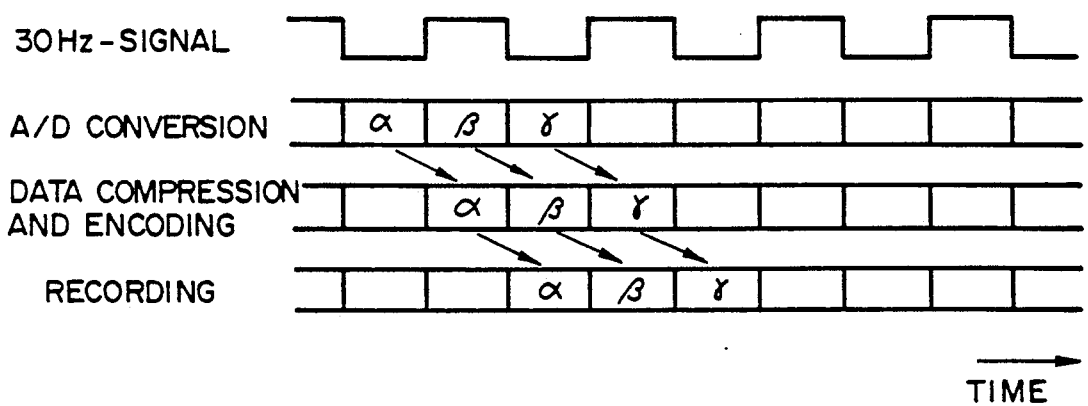
FIG. 3 shows the data transferring timing and the recording timing for recording in an ordinary recording mode in the embodiment shown in FIG. 1.

FIG. 3 shows the operation timing in an ordinary recording mode.

The controller 127 controls the recording portion 109, etc. synchronously with a 30 Hz-signal (in the case of an NTSC video signal).

The controller 127 first instructs the A/D converter 113 to carry out A/D conversion of data $\alpha$ at a certain half period increment of the 30 Hz-signal.

During the subsequent half period increment, the controller 127 instructs the data compressor 114-I to compress the data, the selector 115 to select the data compressor 114-I and the encoder 116 to carry out a predetermined processing.

At the next third half period increment, the controller 127 subsequently supplies the data output from the encoder 116 to the modulator 117, the recording amplifier 118 and the rotary head 103 or 104, thereby recording the data on the magnetic tape 101.

In the ordinary recording mode, when data $\alpha$, $\beta$ and $\gamma$ are output in succession, these segments of data are subsequently recorded in that order.

Figure 4:
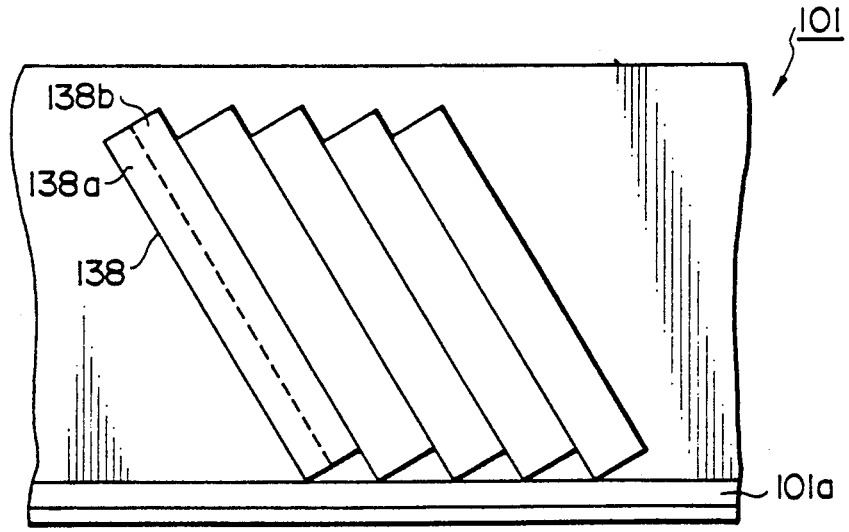
FIG. 4 explains the track pattern for recording in a long recording mode in the embodiment shown in FIG. 1, showing that the portion corresponding to 1 track in an ordinary recording mode is used as 3 tracks.

In the ordinary recording mode, data are recorded in the system shown as a track pattern in FIG. 4.

For example, when the data of 40 MBPS are recorded on the magnetic tape 101 having a width of ½ inch, the rotary drum 102 is rotated at the rate of about 30 rps, and the rotary heads 103 and 104 in the form of two-channel heads are used. In this way, the data for 1 field (1 segment) are recorded in an oblique track 138 (including two tracks 138a and 138b) shown in FIG. 4.

Onto the CT 101a of the magnetic tape 101, a 30Hz-signal is recorded by the fixed head 107.

Figure 5:
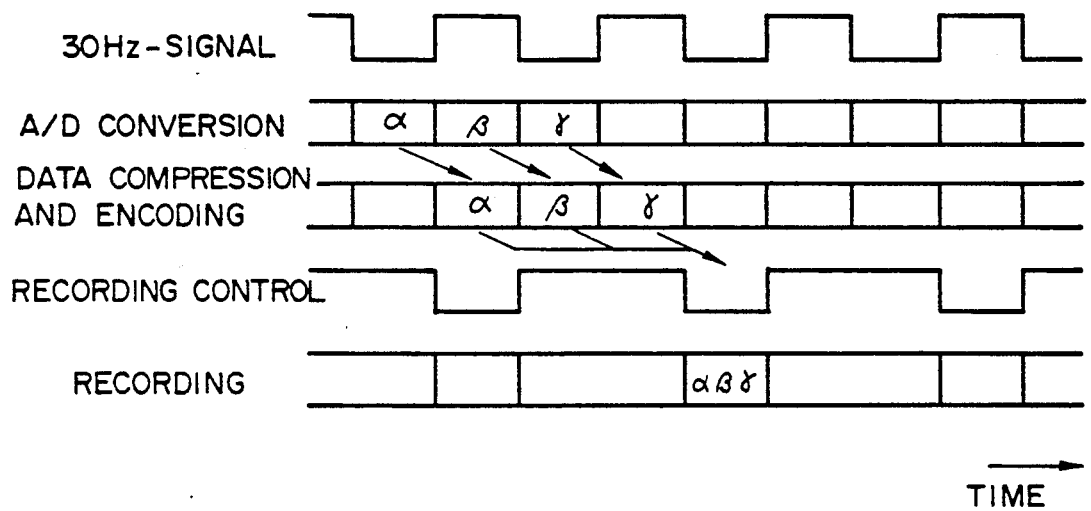
FIG. 5 shows the track pattern for recording in an ordinary recording mode in the embodiment shown in FIG. 1.

FIG. 5 shows the operation timing in a long recording mode. The timing control by the controller 127 is the same as in the ordinary recording mode until the encoding process.

The long recording mode is characterized in that the controller 127 so controls the recording timing that the 3 segments of data $\alpha$, $\beta$ and $\gamma$ are recorded on the magnetic tape 101 at the same timing. In other words, the controller 127 generates a signal which rises at every three half periods of a 30 HZ-signal as a recording control signal.

Figure 6:
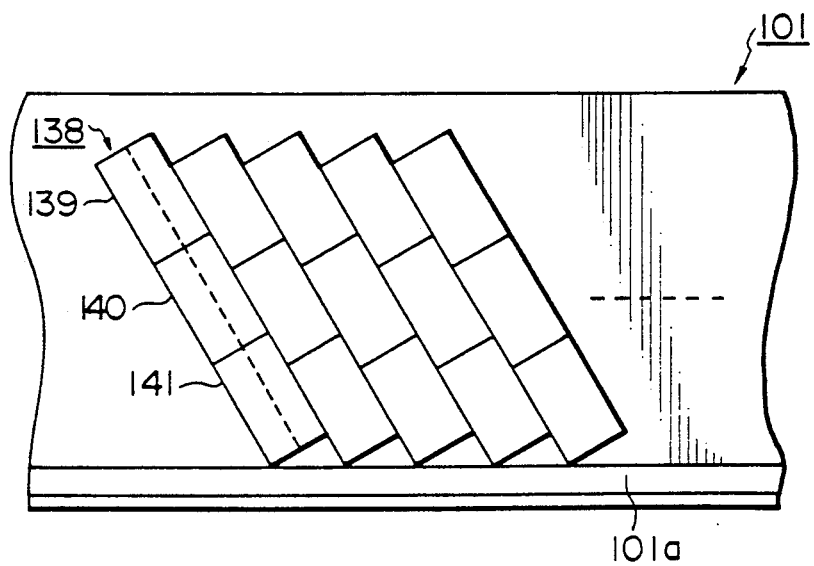
FIG. 6 shows the data transferring timing and the recording timing for recording in a long recording mode in the embodiment shown in FIG. 1 in the state of collectively recording data $\alpha$, $\beta$ and $\gamma$.

FIG. 6 shows the recording system in the long recording mode as a track pattern.

When the three segments of data are collectively recorded on the one oblique track 138 in accordance with the recording control signal, they are recorded in segment areas 139, 140 and 141, respectively.

When the recorded data are reproduced by the apparatus of this embodiment, the controller 127 instructs the selector 123 to select either the output of the data expander 122-I or the output of the data expander 122-II depending upon whether the apparatus is operated in an ordinary recording mode or in a long recording mode.

In this way, according to this embodiment, it is possible to record both in an ordinary recording mode and in a long recording mode without changing the number of revolutions of the rotary drum 102, namely, the electromagnetic transducing characteristics, or changing the track pitch.

Figure 7:
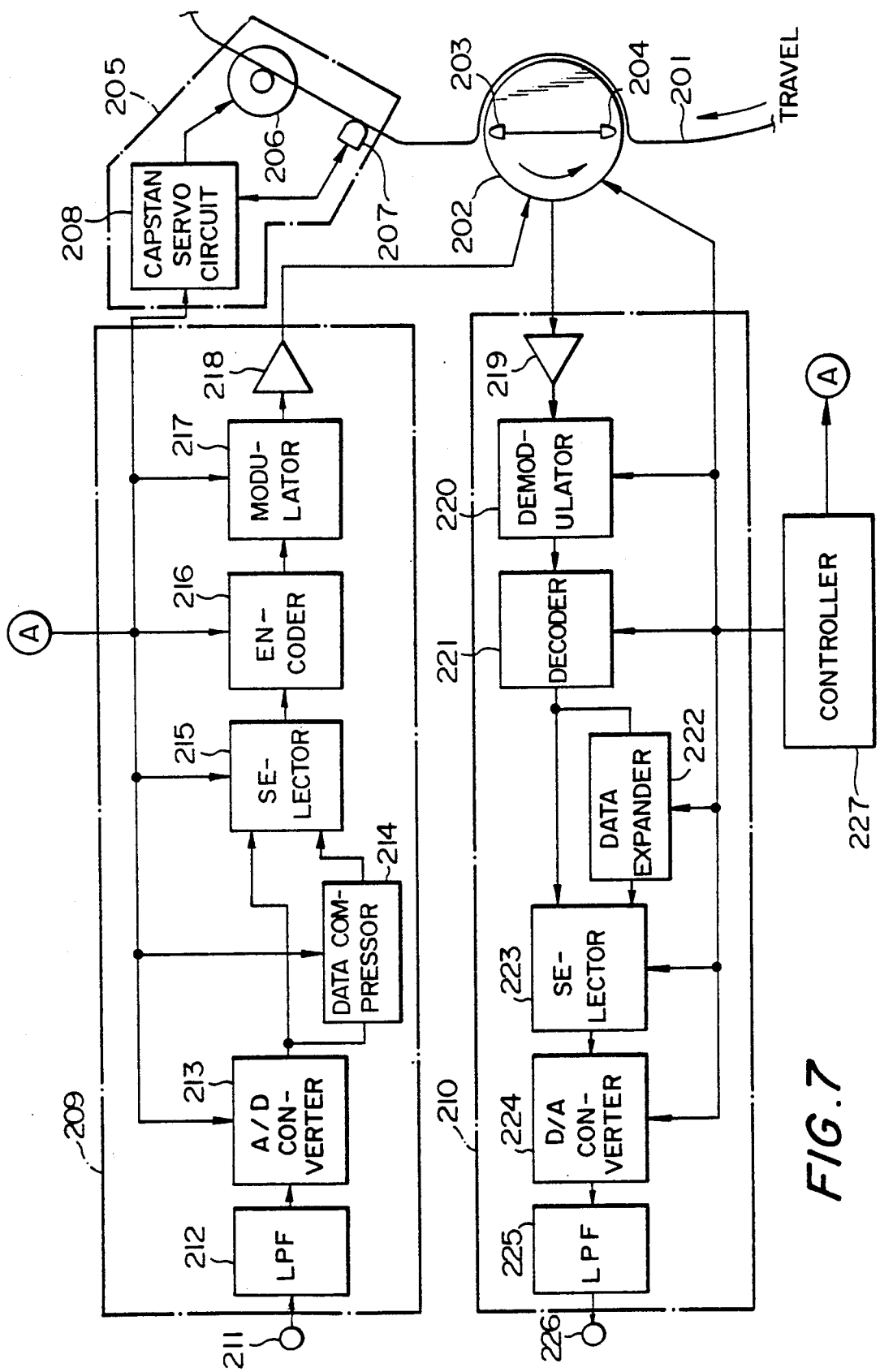
FIG. 7 is a block diagram of the structure of a second embodiment of a digital video signal apparatus according present invention.

FIG. 7 shows the structure of a second embodiment of a digital video signal recording apparatus according to the present invention.

This embodiment is different from the first embodiment that only one data compressor 214 is used, and the output of an A/D converter 213 is directly connected to a selector 215. In correspondence with these differences, only one data expander 222 is used and the output of an encoder 221 is directly connected to a selector 223.

In other words, in a recording portion 209 in this embodiment, the output of the A/D converter 213 is both directly supplied to the selector 215 and compressed to the ⅓ rate by the data compressor 214 before it is supplied to the selector 215. In a reproducing portion 210, the output the decoder 221 is both directly supplied to the selector 223 and expanded to three times by the data expander 222 before it is supplied to the selector 223.

This embodiment is further different from the first embodiment in the recording system in a long recording mode.

Figure 8:
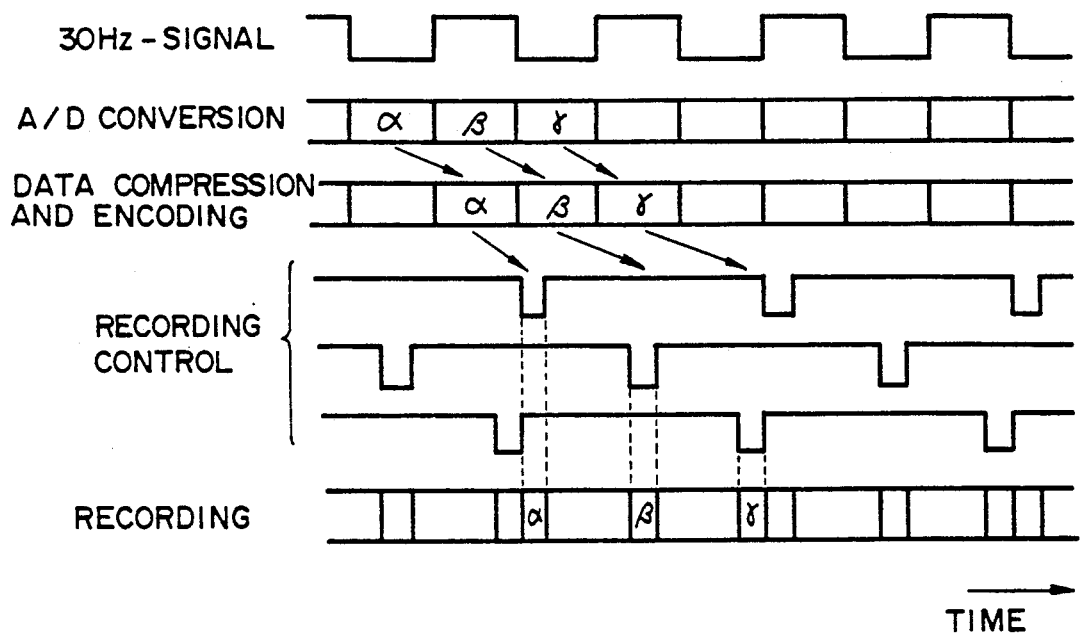
FIG. 8 shows the data transferring timing and the recording timing for recording in a long recording mode the embodiment shown in FIG. 7.
Figure 9:
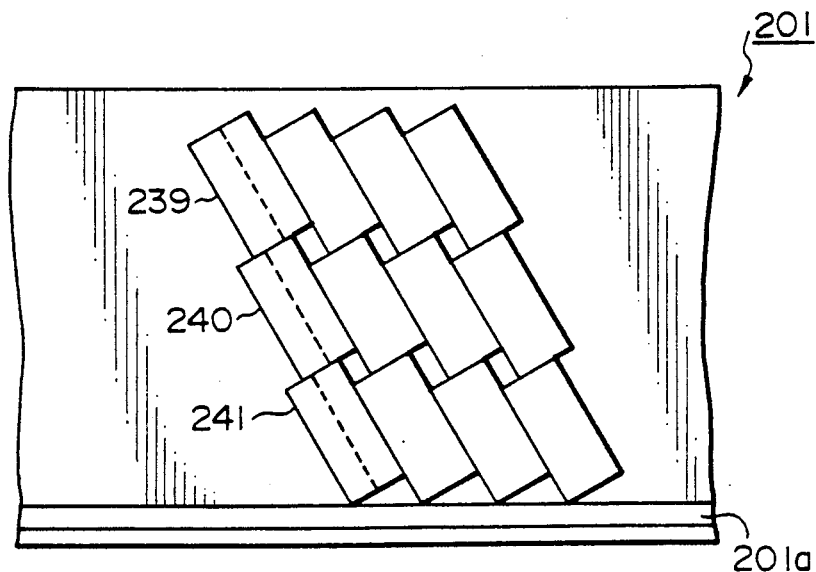
FIG. 9 shows the track pattern for recording in a long recording mode in the embodiment shown in FIG. 7.
Figure 11:
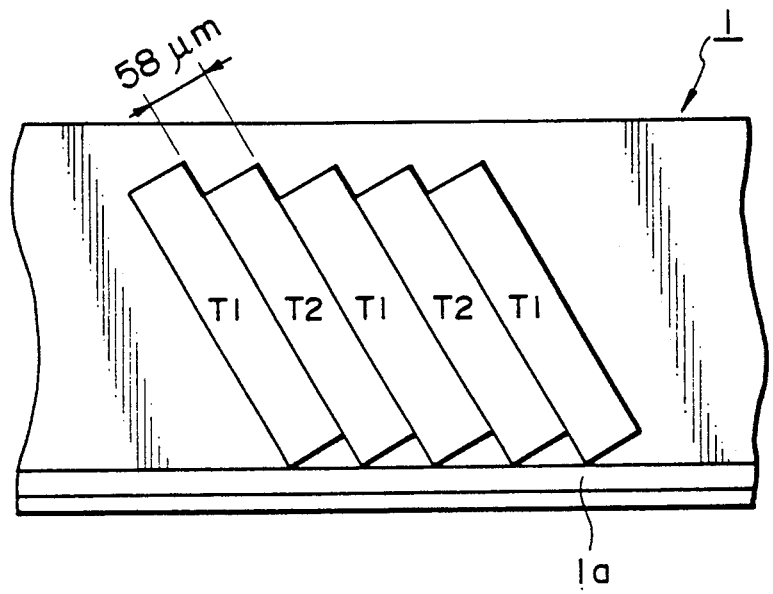
FIG. 11 shows the track pattern for recording in an ordinary recording mode in the conventional video signal recording apparatus.
Figure 12:
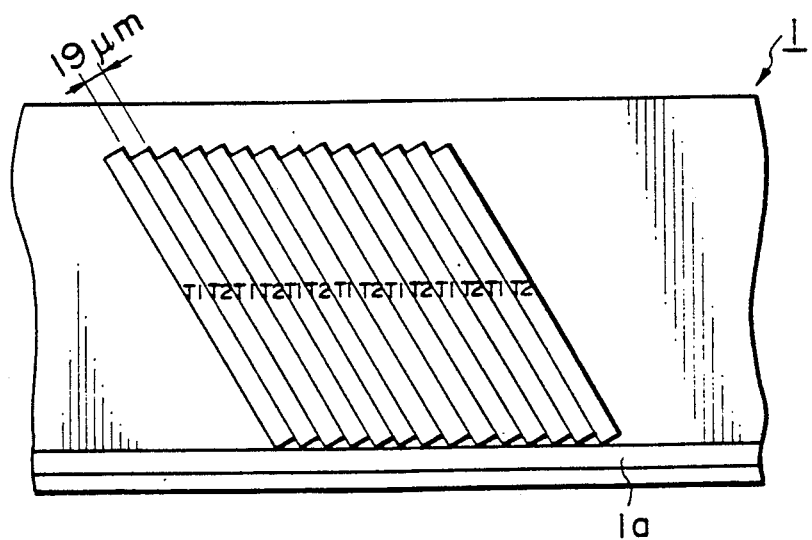
FIG. 12 shows the track pattern for recording in a long recording mode in the conventional video signal recording apparatus.
Figure 10:
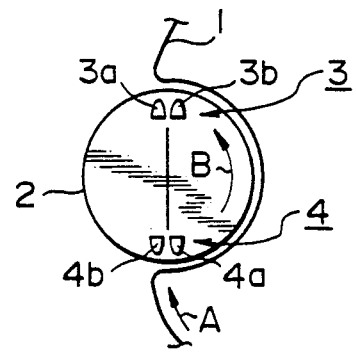
FIG. 10 schematically shows the structure of a conventional video signal recording apparatus in the vicinity of the rotary drum.
Figure 13:
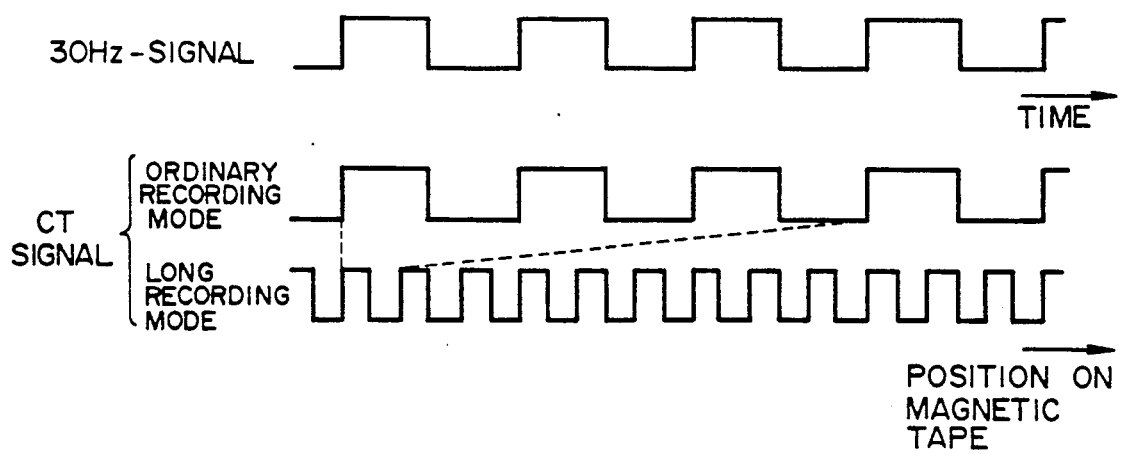
FIG. 13 is an explanatory view of a CT signal recorded in a control track.

FIG. 8 shows the recording timing in a long recording mode in this embodiment, and FIG. 9 shows the track pattern indicating the recording system.

As shown in FIG. 8, in this embodiment, three kinds of recording control signals are generated by a controller 227. These recording control signals are signals which break at different three half periods of a 30 Hz-signal and at different timings in the respective half periods. The data output from an encoder 216 are recorded on a magnetic tape 201 in accordance with the breaking of any of these recording control signals.

If each of the rotary heads 203 and 204 is a two-channel head, three segments of data are recorded in segment areas 239, 249 and 241, respectively.

Thus, according to this embodiment, it is also possible to record both in an ordinary recording mode and a long recording mode without changing the number of revolutions of rotary drum 202 or the track pitch as in the first embodiment.

While there has been described what are at present considered to be preferred embodiments of the invention, will be understood that various modifications may be made thereto, and it is intended that the appended claims cover all such modifications as fall within the true spirit and scope of the invention.

What is claimed is:

1. In a digital video signal recording system for recording recording data which are produced from digital video signals generated by an analog-to-digital converter, and supplied to a rotary head, said recording data recorded in tracks of a magnetic tape which is fed at a constant speed, the improvement comprising a method of recording which can selectively record in one of an ordinary recording mode and a long recording mode, said long recording mode including the steps of:

sending said digital video signals produced by said analog-to-digital converter directly to a data compressor:

compressing said digital video signals in said data compressor at a rate of 1/N (where N can be any integer greater than 1) of a data rate adopted in recording in said ordinary recording mode, thereby producing compressed data;

feeding the output of said data compressor to a selector, and directly feeding an output of said selector to an encoder;

feeding said magnetic tape at a speed of 1/N of the speed adopted in recording in said ordinary recording mode; and recording said recording data for one field in a recording time of 1/N as long as the time for recording in said ordinary recording mode, whereby said recording data for one field, which are recorded in M (M: an integer greater than N) tracks in said ordinary recording mode, are recorded in about M/N intermittent tracks in said long recording mode (M/N not being limited to an integer).

2. A method according to claim 1, wherein the step of recording said recording data in said long recording mode is recorded in L tracks (L: an integer) as a unit by using an L-channel rotary head.

3. A digital video signal recording apparatus for recording recording data for 1 field in M (M: an integer greater than integer N) tracks in an ordinary recording mode and in about M/N intermittent tracks in a long recording mode (M/N not being limited to an integer), said apparatus comprising:

a magnetic tape feeding means for feeding a magnetic tape at a constant speed;

a rotary head for recording digital recording data in tracks on said magnetic tape;

a recording means for recording said recording data on said magnetic tape in said ordinary recording mode, and recording data in said long recording mode at a data rate of 1/N (where N can be any integer greater than 1) of the data rate adopted in recording in said ordinary recording mode, said recording means comprising:

an A/D converter for producing digital video signals from analog video signals, data compression means, directly receiving an output of said A/D converter, for compressing said digital video signals at a data rate of 1/N of the data rate adopted in recording in said ordinary recording mode, and selector means, directly receiving an output of said A/D converter and directly receiving an output of said data compression means, for selecting said output of said A/D converter when in said ordinary recording mode and selecting said output of said data compression means when in said long recording mode; and a control means for controlling said magnetic tape feeding means in said long recording mode so that the feeding rate of said magnetic tape is 1/N of the rate in said ordinary recording, and controlling said recording means in a long recording mode so that the recording data for 1 field are recorded in the recording time of 1/N as long as the recording time in said ordinary recording mode.

4. A digital video signal recording apparatus according to claim 3, wherein said rotary head is provided on the periphery of a rotary drum which rotates at a predetermined angular velocity.

5. A digital video signal recording apparatus according to claim 3, wherein said rotary head has L (L: and integer) channels.

6. A digital video signal recording apparatus according to claim 5, wherein said control means so controls said recording means that said recording data are recorded intermittently in L tracks as a unit in said long recording mode.

7. A digital video signal recording apparatus according to claim 6, wherein
said digital video signal is composed of segments each of which includes an identification code indicating whether said apparatus is operated in said long recording mode or in said ordinary recording mode, and
said recording means records said recording data for N segments in said magnetic tape as 1 field.

8. A digital video signal recording apparatus according to claim 7, wherein said magnetic tape feeding means includes:
a capstan motor for feeding said magnetic tape;
a fixed head for recording/reproducing a magnetic tape feeding speed control signal in a control track provided in the longitudinal direction of said magnetic tape; and
a capstan servo circuit for detecting the frequency of said magnetic tape feeding speed control signal reproduced by said fixed head and controlling said magnetic tape feeding speed control signal by a servomechanism,
whereby said magnetic tape is fed at a constant speed.

9. A digital video signal recording apparatus according to claim 3, wherein said magnetic tape feeding means includes:
a capstan motor for feeding said magnetic tape;
a fixed head for recording/reproducing a magnetic tape feeding speed control signal in a control track provided in the longitudinal direction of said magnetic tape; and
a capstan servo circuit for detecting the frequency of said magnetic tape feeding speed control signal reproduced by said fixed head and controlling said magnetic tape feeding speed control signal by a servomechanism,
whereby said magnetic tape is fed at a constant speed.

10. A digital video signal recording apparatus according to claim 3, wherein
said digital video signal is composed of segments each of which includes an identification code indicating whether said apparatus is operated in said long recording mode or in said ordinary recording mode, and
said recording means records said recording data for N segments in said magnetic tape as 1 field.

11. A digital video signal recording apparatus according to claim 3, wherein said control means so controls said recording means that said recording data are recorded at every 1N field in said long recording mode.

12. A digital video signal recording apparatus according to claim 11, wherein
said digital video signal is composed of segments each of which includes an identification code indicating whether said apparatus is operated in said long recording mode or in said ordinary recording mode, and
said recording means records said recording data for N segments in said magnetic tape as 1 field.

13. A digital video signal recording apparatus according to claim 12, wherein said magnetic tape feeding means includes:
a capstan motor for feeding said magnetic tape;
a fixed head for recording/reproducing a magnetic tape feeding speed control signal in a control track provided in the longitudinal direction of said magnetic tape; and
a capstan servo circuit for detecting the frequency of said magnetic tape feeding speed control signal reproduced by said fixed head and controlling said magnetic tape feeding speed control signal by a servomechanism,
whereby said magnetic tape is fed at a constant speed.

14. A digital video signal recording apparatus according to claim 13, wherein said rotary head has L (L: and integer) channels.

15. In a digital video signal recording system for recording recording data which is produced from digital video signals and supplied to a rotary head in tracks of a magnetic tape which is fed at a constant speed, the improvement comprising a method of recording in one of an ordinary recording mode and a long recording mode including the steps of:
selecting one of said ordinary recording mode and said long recording mode;
compressing said recording data at a rate of 1/N (where N can be any integer greater than one) of a data rate adopted in recording in said ordinary recording mode when said long recording mode is selected, thereby producing compressed data;
sending said compressed data directly to an encoder to encode said compressed data and adding an error-correcting code;
feeding said magnetic tape at a speed of 1/N of the speed adopted in recording in said ordinary recording mode; and
recording said recording data for 1 field in a recording time of 1/N as long as the time for recording in said ordinary recording mode, whereby said recording data for 1 field which are recorded in M (M: an integer) tracks in said ordinary recording mode are recorded in about M/N intermittent tracks in said long recording mode.

16. A method as recited in claim 1, wherein said step of sending said compressed data directly to an encoder to encode said compressed data is the only encoding performed.

17. A digital video signal recording apparatus for recording data, representative of analog video signals, in either an ordinary recording mode or in a long recording mode, said apparatus comprising:
an A/D converter for producing digital video signals from analog video signals, p1 data compression means for compressing the digital video signals at a data rate of 1/N of the data rate used in recording in said ordinary recording mode, N being an integer,
means for directly coupling said A/D converter to said data compression means,
selector means having first and second inputs corresponding respectively to ordinary and long recording modes,
means for coupling the A/D converter directly to said first input of said selector means,
means for coupling the output of the data compression means to the second input of said selector means, encoding means for encoding data, the encoding means receiving data from the selector means, means for recording data, the means for recording data receiving data from the encoding means, and a control means, responsive to selection of said ordinary or long recording modes, for controlling said selector means and for controlling the means for recording such that one field of data is recorded in a plurality of tracks, if the ordinary recording mode is selected, and is recorded in at least one track plus a portion of an adjacent track, if the long recording mode is selected.

18. A digital video signal recording system as recited in claim 17, wherein said means for coupling the A/D converter directly to said first input of said selector means comprises a second data compression means for compressing said digital video signal at a data rate less than the data rate 1/N.

19. A digital video signal recording apparatus for recording and reproducing recording data for 1 field in M (M: an integer greater than integer N) tracks in an ordinary recording mode and in about M/N intermittent tracks in the long recording mode (M/N not being limited to an integer), said apparatus comprising:

a magnetic tape feeding means for feeding a magnetic tape at a constant speed;

a rotary head for recording digital recording data in tracks on said magnetic tape, said rotary head reproduces said recording data recorded on said magnetic tape and outputs said data as reproduced data;

means for reproducing data for M tracks in said ordinary recording mode and reproducing data for about M/N intermittent track in said long recording mode in the form of video signals for one field;

a recording means for recording said recording data on said magnetic tape in said ordinary recording mode; and recording data in said long recording mode at a data rate of 1N (where N can be any integer greater than one) of the data rate adopted in recording in said ordinary recording mode, said recording means comprising:

an A/D converter for producing digital video signals from analog video signals, data compression means, directly receiving an output of said A/D converter, for compressing said digital video signals at a data rate of 1/N of the data rate adopted in recording in said ordinary recording mode, and selector means, directly receiving an output of said A/D converter and directly receiving an output of said data compression means, for selecting said output of said A/D converter when in said ordinary recording mode and selecting said output of said data compression means when in said long recording mode; and a control means for controlling said magnetic tape feeding means in said long recording mode so that the feeding rate of said magnetic tape is 1/N of the rate in said ordinary recording mode, and controlling said recording means in a long recording doe so that the recording data for 1 field are recorded in the recording time of 1/N as long as the recording time in said recording mode.

20. A digital video signal recording apparatus according to claim 19, said reproducing means includes a D/A converter for converting a digital video signal to an analog video signal.

21. A digital video signal recording apparatus according to claim 19, wherein:

said reproducing means includes a data expander for a long recording mode which expands said reproduced data to N times and outputting said data as expanded data, and a selector on the reproducing side for reading said reproduced data and said expanded data, selecting said reproduced data at the time of ordinary recording and said expanded data at the time of long recording, respectively, and outputting the selected data as digital video signals.

22. A digital video signal recording apparatus according to claim 19, wherein said recording means includes a data compressor for a long recording mode which compresses digital video signals so as to produce compressed data for long recording, a data compressor for an ordinary recording mode which compresses said digital video signals at a data rate of 1/N of the data rate adopted for compressed data for long recording, thereby producing compressed data for ordinary recording, and a selector on the recording side for reading said compressed data for ordinary recording and said compressed data for long recording, selecting said compressed data for ordinary recording at the time of ordinary recording and said compressed data for long recording at the time of long recording, respectively, and outputting the selected data as recording data; and said reproducing means includes a data expander for ordinary recording mode which expands said reproduced data and outputs aid reproduced data as expanded data for ordinary recording, a data expander for a long recording mode which expands said reproduced data to N times of the data rate of said expanded data for ordinary recording so as to produce expanded data for long recording, and a selector on the reproducing side for reading said expanded data for ordinary recording and said expanded data for long recording, selecting said expanded data for ordinary recording at the time of ordinary recording and said expanded data for long recording at the time of long recording, respectively, and outputting the selected data as digital video signals.

23. A digital video signal recording apparatus according to claim 19, wherein said recording means further includes an encoder for shuffling said recording data and adding an error-correcting code thereto; and said reproducing means includes a decoder for correcting an error of said reproducing data and rearranging said reproducing data in accordance with the rule corresponding to the rule for shuffling and encoding of said encoder.

24. A digital video signal recording apparatus according to claim 19, wherein said recording means further includes a modulator for modulating said recording data in a predetermined modulating system, and said reproducing means includes a demodulator for demodulating said reproducing data in a demodulating system which corresponds to the modulating system of said modulator.

25. A digital video signal recording apparatus for recording data, representative of analog video signals, in either an ordinary recording mode or in a long recording mode, said apparatus comprising:

an A/D converter for producing digital video signals from analog video signals, data compression means for compressing the digital video signals at a data rate of 1/N of the data rate used in recording in said ordinary recording mode, N being an odd integer, means for directly coupling said A/D converter to said data compression means, selector means having first and second inputs corresponding respectively to ordinary and long recording modes, means for coupling the A/D converter directly to said first input of said selector means, means for coupling the output of the data compression means to the second input of said selector means, encoding means for encoding data, the encoding means receiving data from the selector means, means for recording data, the means for recording data receiving data from the encoding means, and a control means, for controlling said selector means as for controlling the means for recording in response to the selection of recording modes.

26. A digital video recording apparatus as set forth in claim 25 wherein said encoding means includes means for shuffling the data received from the selector means and means for adding an error-correcting code thereto.

27. A digital video signal recording apparatus for recording data, representative of analog video signals, in either an ordinary recording mode or in a long recording mode, said apparatus comprising:

an A/D converter for producing digital video signals from analog video signals, data compression means for compressing the digital video signals at a data rate of 1/N of the data rate used in recording in said ordinary recording mode, means for directly coupling said A/D converter to said data compression means, selector means having first and second inputs corresponding respectively to ordinary and long recording modes, means for coupling the A/D converter directly to said first input of said selector means, means for coupling the output of the data compression means to the second input of said selector means, encoding means for encoding data, the encoding means receiving data from the selector means, means for recording data, the means for recording data receiving data from the encoding means and wherein the means for recording data includes a plurality of rotary heads, a control means, responsive to the selection of recording mode, for controlling said selector means and for controlling the means for recording such that one field of data is recorded by the plurality of recording heads in a first format, if the ordinary recording mode is selected, and is recorded by the plurality of recording heads in a second format, if the long recording mode is selected, the second format being compressed.

28. Digital video signal recording apparatus as set forth in claim 27, wherein the plurality of rotary heads are provided on the periphery of a rotary drum which rotates at a predetermined angular velocity.

29. A digital video recording apparatus as set forth in claim 27 wherein each rotary head of the plurality of rotary heads has L channels, L being an integer.

30. A digital video recording apparatus as set forth in claim 27 wherein said encoding means includes means for shuffling the data received from the selector means and means for adding an error-correcting code thereto.

* * * * *